(12) United States Patent
Stuck et al.

(10) Patent No.: US 10,071,749 B2
(45) Date of Patent: Sep. 11, 2018

(54) EXTERNAL RUNFLAT APPARATUS

(71) Applicant: HUTCHINSON S.A., Paris (FR)

(72) Inventors: Larry W. Stuck, Amherst, NY (US); Charles Tabone, North Tonawanda, NY (US); Christopher R. Renson, Langhorne, PA (US)

(73) Assignee: HUTCHINSON S.A., Paris (FR)

( * ) Notice: Subject to any disclaimer, the term of this patent is extended or adjusted under 35 U.S.C. 154(b) by 107 days.

(21) Appl. No.: 14/197,492

(22) Filed: Mar. 5, 2014

(65) Prior Publication Data

US 2014/0252790 A1   Sep. 11, 2014

Related U.S. Application Data

(60) Provisional application No. 61/775,175, filed on Mar. 8, 2013.

(51) Int. Cl.
| | |
|---|---|
| *B60B 21/00* | (2006.01) |
| *B61B 13/04* | (2006.01) |
| *B61F 99/00* | (2006.01) |
| *B60B 11/10* | (2006.01) |
| *B60B 17/02* | (2006.01) |
| *B60B 25/00* | (2006.01) |
| *B60B 15/26* | (2006.01) |

(52) U.S. Cl.
CPC .............. *B61B 13/04* (2013.01); *B60B 11/10* (2013.01); *B60B 17/02* (2013.01); *B60B 25/006* (2013.01); *B61F 99/00* (2013.01); *B60B 15/263* (2013.01)

(58) Field of Classification Search
CPC ..... B60B 11/10; B60B 15/263; B60B 25/006; B61F 99/00; B61B 13/04; B61B 13/06

USPC ..... 295/31.1, 8, 9.1; 104/118, 119; 105/141, 105/144

See application file for complete search history.

(56) References Cited

U.S. PATENT DOCUMENTS

| | | | | |
|---|---|---|---|---|
| 1,992,073 | A * | 2/1935 | Hempel | H01B 17/22 |
| | | | | 174/172 |
| 1,992,078 | A | 2/1935 | Ludwick | |
| 2,617,689 | A | 11/1952 | Olivieri | |
| 3,116,094 | A | 12/1963 | Glasgow | |
| 3,883,181 | A * | 5/1975 | Dissinger | 301/37.42 |
| 4,339,031 | A * | 7/1982 | Densmore | 198/861.2 |
| 5,026,106 | A * | 6/1991 | Biermann | 295/1 |
| 5,551,762 | A * | 9/1996 | Roopngam | B60B 11/10 |
| | | | | 301/38.1 |
| 5,816,169 | A * | 10/1998 | MacKenzie | 105/141 |
| 5,842,422 | A * | 12/1998 | Bishop | 104/244 |
| 7,503,362 | B2 * | 3/2009 | Chandler | B60C 15/028 |
| | | | | 152/152 |

(Continued)

FOREIGN PATENT DOCUMENTS

FR          437422         4/1912

OTHER PUBLICATIONS

International Search Report and Written Opinion for Application No. PCT/IB2014/00837, dated Jul. 10, 2014.

*Primary Examiner* — Samuel J Morano, IV
*Assistant Examiner* — Jean W Charleston
(74) *Attorney, Agent, or Firm* — K&L Gates LLP

(57) ABSTRACT

An external runflat apparatus for a guide wheel system of a monorail transport system. The external runflat apparatus includes a hub member and a tread member. The tread member is connected to the hub member and includes a base member and a covering over the base member.

22 Claims, 5 Drawing Sheets

(56) References Cited

U.S. PATENT DOCUMENTS

| | | | | |
|---|---|---|---|---|
| 7,731,299 | B2* | 6/2010 | Thompkins | ............... 301/38.1 |
| 2001/0037747 | A1* | 11/2001 | Svensson | ............. B60L 13/06 |
| | | | | 104/120 |
| 2010/0096059 | A1* | 4/2010 | Lust | ................. B60C 17/04 |
| | | | | 152/518 |
| 2010/0117441 | A1* | 5/2010 | Auvray | ............... B60C 17/06 |
| | | | | 301/5.1 |
| 2012/0217790 | A1* | 8/2012 | Gardetto | ............ B60C 15/028 |
| | | | | 301/8 |

* cited by examiner

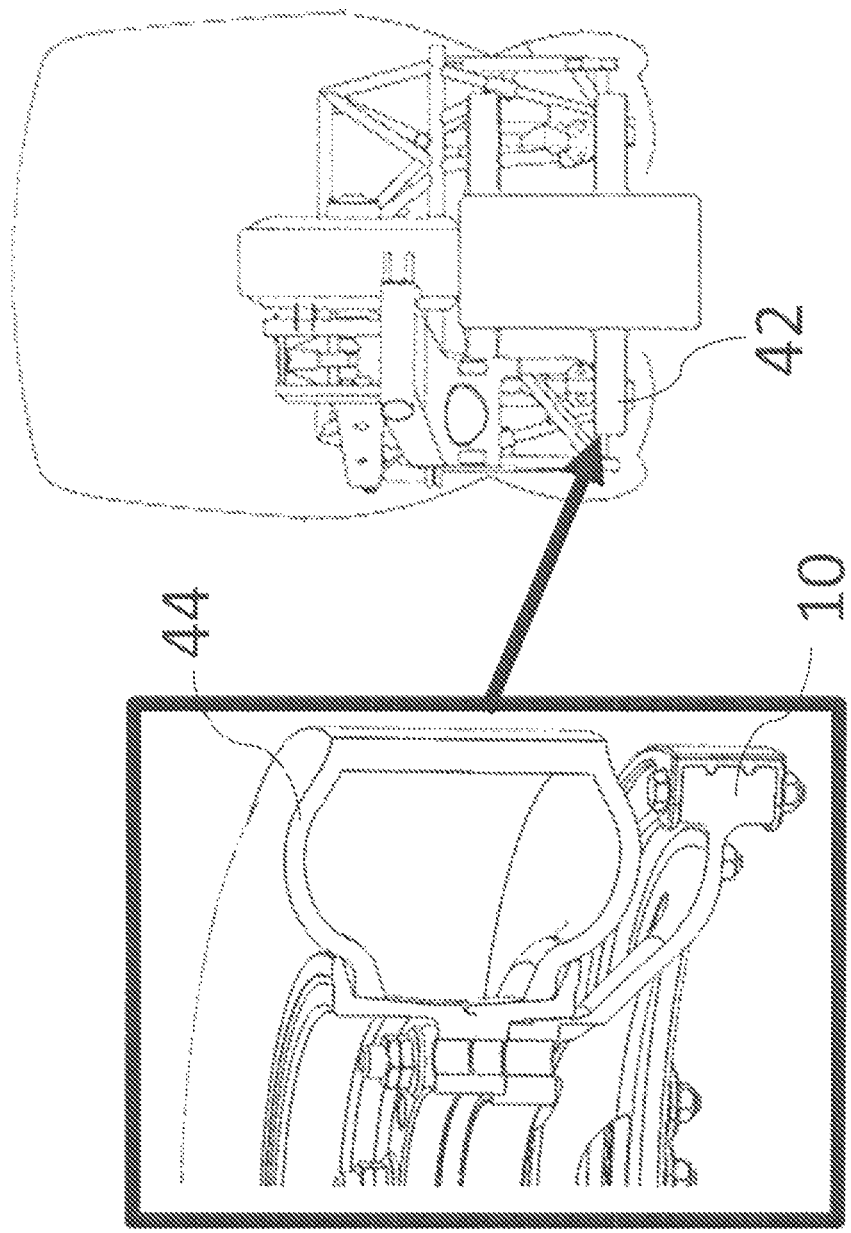

US 10,071,749 B2

EXTERNAL RUNFLAT APPARATUS

CROSS-REFERENCE TO RELATED APPLICATION

This application claims the benefit under 35 U.S.C. § 119(e) of the earlier filing date of U.S. Provisional Patent Application No. 61/775,175 filed on Mar. 8, 2013.

BACKGROUND

This application discloses an invention which is related, generally and in various embodiments, to an external runflat apparatus. The external runflat apparatus may be utilized in a guide wheel system of a monorail transport system.

Monorail systems are present throughout the world, and for certain applications, provide an effective way of moving people from one location to another. In general, an exemplary monorail system includes one or more monorail cars which ride on a monorail track, and each monorail car has a corresponding monorail bogie system. The monorail bogie system includes pneumatic drive wheel tires which operate to carry the load associated with the monorail car and propel the monorail car in a given direction along the monorail track, and pneumatic guide wheel tires which operate to guide the monorail car along the monorail track and stabilize the monorail car with respect to any excessive "sideways" movement.

In order to provide stability for the monorail car, the pneumatic guide wheel tires are positioned against both the "left" side and the "right" side of the monorail track. With this arrangement as the monorail car begins to move to the "left" side of the center of the monorail track (e.g., as the monorail car is passing through a curved section of the monorail track and centrifugal forces cause the "leftward" movement), the pneumatic guide wheel tires positioned against the "right" side of the monorail track begin to exert mote force against the "right" side of the monorail truck. The exertion of this force causes the pneumatic guide wheel tires to compress or deflect, and the compression or deflection operates to counteract the "leftward" movement of the monorail car and encourage the monorail car to move back toward the center of the monorail track. An analogous sequence occurs if the monorail car moves to the "right" of the center of the monorail track.

Although the above-described pneumatic guide wheel tire arrangement has been employed to provide a certain level of stabilization to monorail cars, the overall effectiveness or such stabilization efforts has been less than desired. For example, since tire pressure can vary over time for a variety of reasons (e.g., temperature, leakage, etc.), if the tire pressure of one or more of the pneumatic guide wheel tires fails below a normal operational level, the stability provided by the affected pneumatic guide wheel ores will be less than desired. Similarly, if external forces such as high winds cause more compression or deflection than the normal operational compression or defection of one or more of the pneumatic guide wheel tires, the stability provided by the affected pneumatic guide wheel tires will be less than desired.

To address such issues, "internal tire runflats" have been utilized with the pneumatic guide wheel tires. These internal runflats are commonly composed of rubber or composites, and are limited in their ability to precisely control the amount of pneumatic guide wheel tire deflection, as the applied load must be transmitted through the compression of the treads of the respective pneumatic guide wheel tires. Often these types of internal runflats are designed with an outside diameter that can provide limited clearance between the internal runflats and the fragile internal liners of the respective pneumatic guide wheel tires. Incidental contact between an internal runflat and the internal liner of a corresponding pneumatic guide wheel tire can occur, for example, from bumps at the expansion joints of the monorail track. If a liner of a pneumatic guide wheel tire is damaged as a result of such incidental contact, the warranty on the pneumatic guide wheel tire can be compromised. Such incidental contact can also create a safety hazard, in that the pressurized air internal to a given pneumatic guide wheel tire can breech the internal liner and escape into the belts of the given pneumatic guide wheel tire, potentially causing a failure of the tire or an explosion. Accordingly, although utilizing internal runflats can be utilized to increase the stability provided by the pneumatic guide wheel tires, the safety and stability provided thereby is still less than desired.

BRIEF DESCRIPTION OF THE DRAWINGS

Various embodiments of the invention are described herein in by way of example in conjunction with the following figures, wherein like reference characters designate the same or similar element.

FIG. 5 illustrates the external runflat apparatus of FIG. 1 utilized with a guide wheel system of a monorail car according to various embodiments.

DETAILED DESCRIPTION

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

Figure 1:
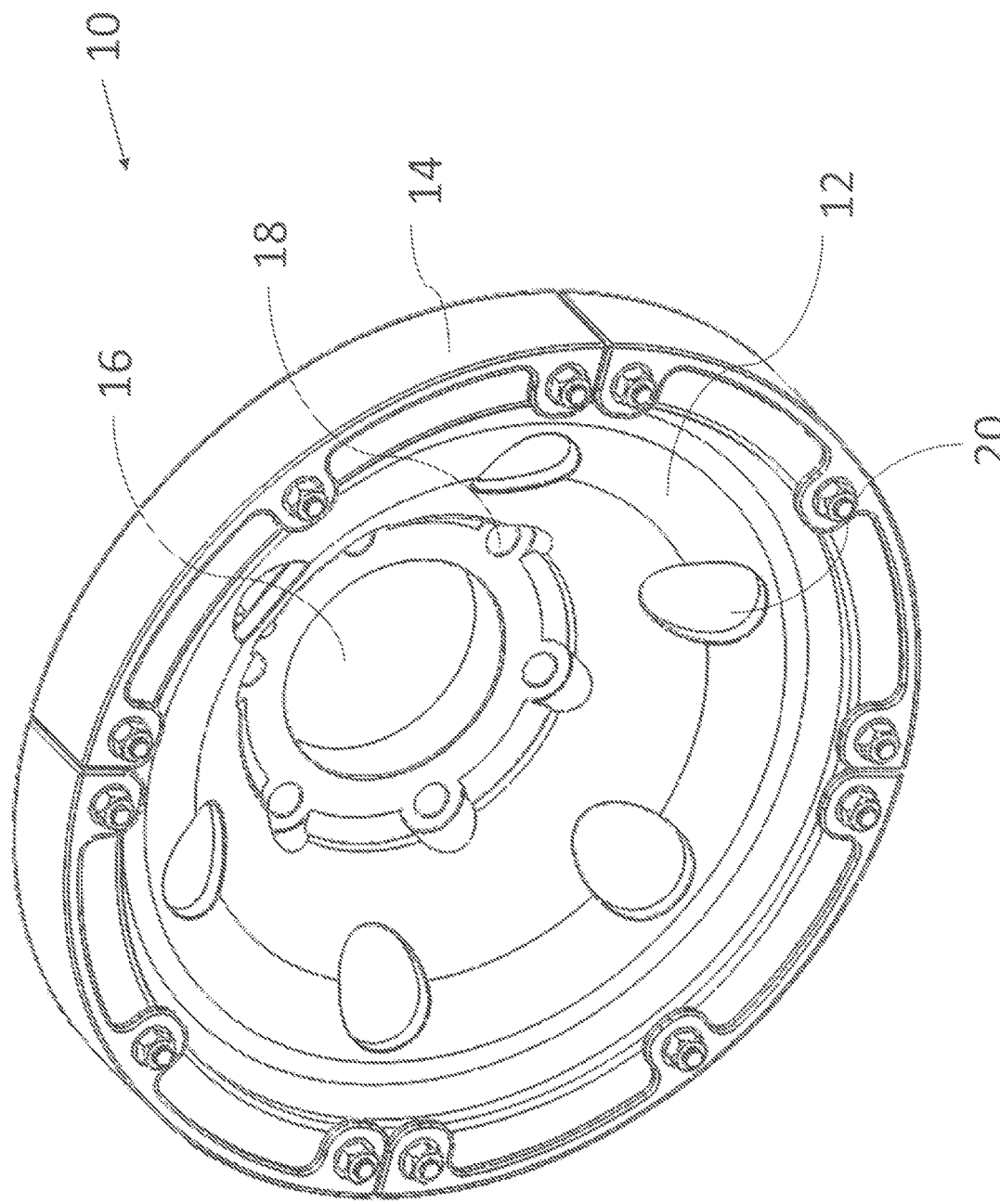
FIG. 1 illustrates various embodiments of an external runflat apparatus.

FIG. 1 illustrates various embodiments of an external run flat apparatus 10. The external runflat apparatus 10 may be utilized with, and form a part of, a guide wheel system (See, e.g., FIG. 5) of a monorail transport system. The external runflat apparatus 10 includes a one-piece hub member 12 and one or more tread members 14 connected to the hub member 12. The one or more tread members 14 may be connected to the hub member 12 in any suitable manner.

The hub member 12 is substantially circular-shaped, may be of any suitable size and may be fabricated from any suitable material. For example, according to various embodiments, the hub member 12 is fabricated from a metal, a plastic, or a composite material. As shown in FIG. 1, according to various embodiments, the hub member 12 defines a central opening 16, defines a plurality of openings 18 which are positioned radially outward from the central opening 16 and are configured to receive studs (not shown) associated with an guide wheel system, defines one or more openings 20 which are positioned radially outward from the openings 18 and are configured to allow for access to a tire valve (not shown) of an external guide wheel.

Figure 2:
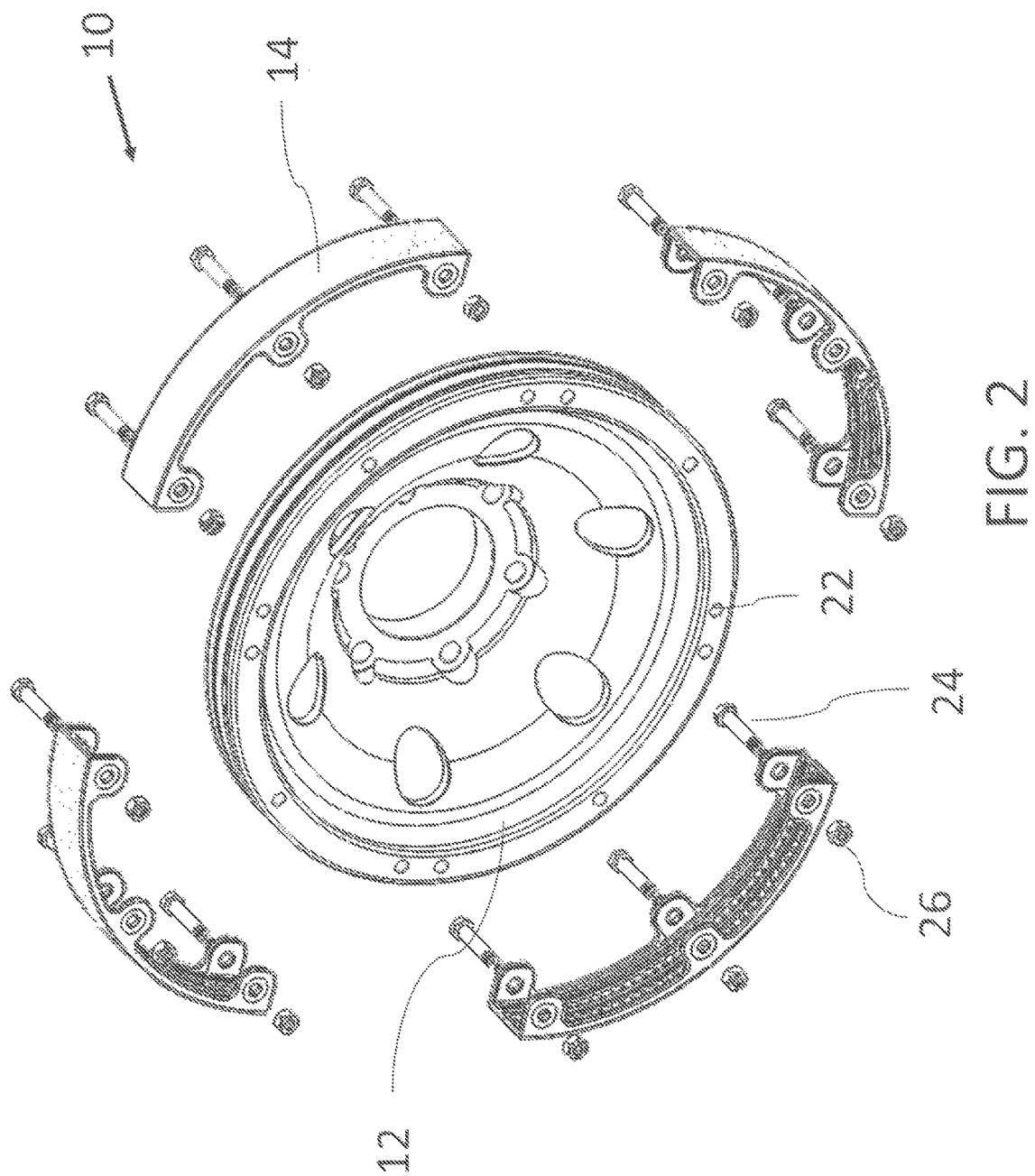
FIG. 2 illustrates an exploded view of the external runflat apparatus of FIG. 1.

As shown more clearly in FIG. 2, according to various embodiments, the hub member 12 also defines a plurality of openings 22 which are positioned radially outward from the openings 20 and me configured to receive fasteners 24 which are utilized to connect the one or more treads members 14 to the hah member 12. The fasteners 24 may be any suitable type of fasteners, and may be fabricated from any suitable material. For example, according to various embodiments, the fasteners 24 may be fabricated loan a metal, a plastic, or a composite material. According to various embodiments, the fasteners 24 are corrosion resistant fasteners. According to various embodiments, the fasteners 24 may be secured in piece with corresponding nuts 26.

Figure 3:
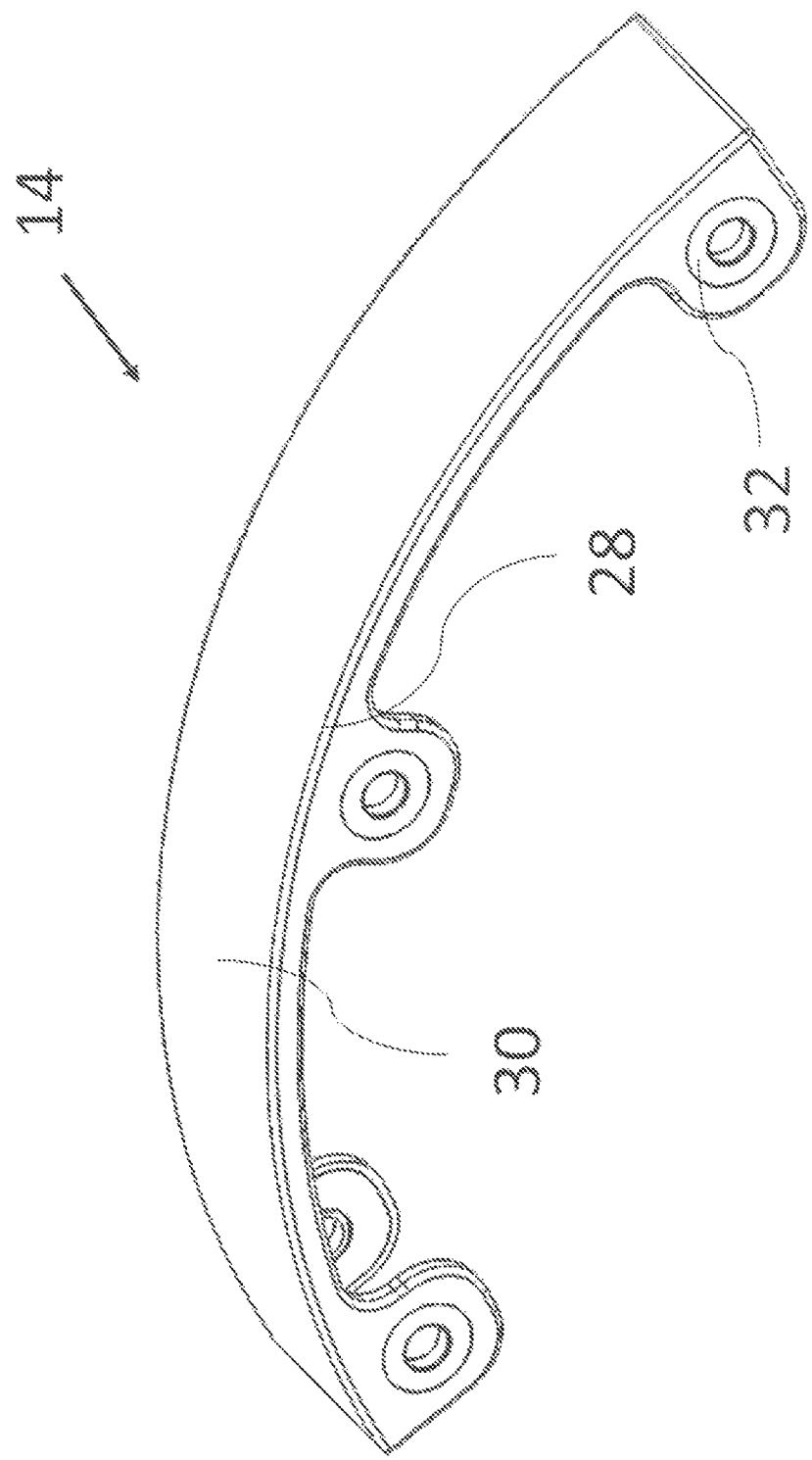
FIG. 3 illustrates various embodiments of a tread member of the external, runflat apparatus of FIG. 1.

FIG. 3 illustrates various embodiments of the one or more tread members 14. For embodiments where the external runflat apparatus 10 includes a plurality of tread members 14, each tread member 14 is substantially arc-shaped, and collectively cooperate to cover the outer circumference of the hub member 12. For embodiments where the external runflat apparatus 10 includes a single tread member 14, the single tread member 14 is substantially circular-shaped and covers the outer circumference of the hub member 12.

Each of the one or more tread members 14 includes a base member 28 and a covering 30 over the base member 28. The base member 28 will be described in more detail hereinbelow with respect to FIG. 4. The covering 30 may be of any suitable "thickness", may include any suitable material, and may be connected to the base member 28 in any suitable manner. For example according to various embodiments, the covering 30 is at least two millimeters thick, includes a material made from a thermoplastic (e.g., a nylon), a thermoset (e.g., a polyurethane), a rubber, or a composite material, and is adhered or mechanically fixed to the base member 28. According to various embodiments, the covering 30 is welded to the base member 28. According to other embodiments, the covering 30 is vulcanized to the base member 30. As also shown in FIG. 3, and as described in more detail hereinbelow, a plurality of bushings 32 may be connected to the head member 14.

Figure 4:
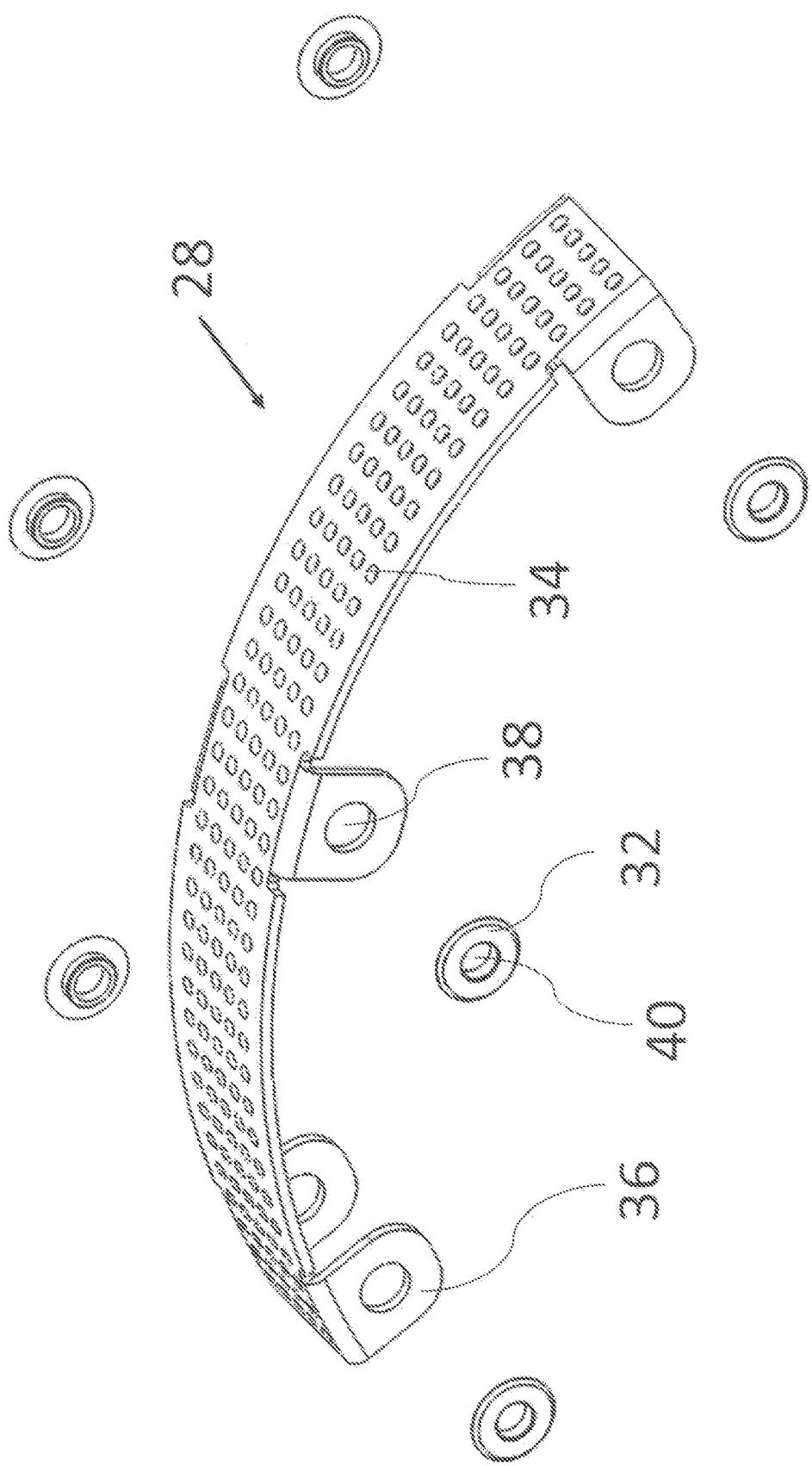
FIG. 4 illustrates various embodiments of a base member of the tread member of FIG. 3.

FIG. 4 illustrates various embodiments of the base member 28 of the one or more tread members 14. The base member 28 may be fabricated from any suitable material. For example, according to various embodiments, the base member 28 may be fabricated from a metal, a plastic, a rubber, or a composite material. As shown in FIG. 4, according to various embodiments, the base member 28 may include a plurality of perforations 34 through the outermost/ circumferential surface of the base member 28. The perforations 34 allow for better adhesion of the covering 30 to the base member 28. For a given base member 28, the perforations also operate to reduce the weight of the base member 28, and by extension, the weight of the associated bead member 14. According to other embodiments, the base member 28 is a solid base member 28 and does not include the plurality of perforations 34 shown in FIG. 4. The base member 28 may also include a plurality of ear members 36 which extend radially inward from the outermost/circumferential surface of the base member 28, and each ear member 34 may define an opening 38 therethrough. For a given tread member 14, according to various embodiments, the opening 38 is configured to receive a corresponding one of the bushings 32, and is coaxially aligned with a corresponding opening 22 of the huh member 12 if the given tread member 14 is connected to the hub member 12.

The bushings 32 may be fabricated from any suitable material. For example, according to various embodiments, the bushings 32 are fabricated from a metal, a plastic, or a composite material. Each bushing 32 defines an opening 40. For a given hashing 32, the opening 40 is configured to receive one of the fasteners 24, and is coaxially aligned with a corresponding opening 22 of the huh member 12 if the given bushing 32 is connected to the base member 28 and the associated tread member 14 is connected to the hub member 12.

FIG. 5 illustrates the external runflat apparatus 10 utilized with a guide wheel system 42 of a monorail car according to various embodiments. In general, each external runflat apparatus 10 is utilized with a corresponding guide wheel tire 44 of the guide wheel system 42. Therefore, it will be appreciated that a monorail car may utilize a plurality of external runflat apparatuses 10. The external runflat apparatus 10 may be connected to the guide wheel system 42 in any suitable manner. For example, according to various embodiments, a given external runflat apparatus 10 may be connected to the same hub studs that a corresponding guide wheel is connected to. For such embodiments (e.g., FIG. 5), the hub studs pass through the openings 18 of the hub member 12 to connect the external runflat apparatus 10 to the guide wheel system 42.

In operation, the external runflat apparatuses 10 improve the overall stability and safety of monorail transport systems by controlling the deflection of the corresponding guide wheel tires 44. More specifically, each external runflat apparatus 10 controls dm upper limit of its corresponding grade wheel tire 44 to maintain a safe level of monorail car stability. This is true even in cases where the corresponding guide wheel tire 44 has failed due to a loss of pressure.

When a corresponding guide wheel tire 44 reaches a certain deflection level, the one or more tread members 14 come into contact with the monorail track and operate as a "harder stop" to absorb a portion of the applied guide wheel tire load, thereby limiting the amount of deflection experienced by the corresponding guide wheel tire 44. The covering 30 of the one or more tread members 14 helps to absorb the shock resulting from the impact of the tread member 14 colliding with the monorail track, and also provides a level of abrasion resistance to protect the monorail track. According to various embodiments, an external runflat apparatus 10 associated with a given monorail car can provide for continued mobility of the monorail car up to a minimum of thirty miles with an applied load of 3,500 pounds.

According to various embodiments, the tensile modulus or other mechanical properties of the covering 30 can be adjusted to different levels of impact resistance, shock absorption, abrasion resistance and deflection (from applied load) to meet the meets of different applications. Additionally, ultra violet (UV) additives and/or moisture resistant additives can be incorporated into the covering 30 to protect the covering 30 against deterioration caused by exposure to external elements.

Nothing in the above description is meant to limit the invention to any specific materials, geometry, or orientation of elements. Many part/orientation substitutions are contemplated within the scope of the invention and will be apparent to those skilled in the art. The embodiments described herein were presented by way of example only and should not be used to limit the scope of the invention.

Although the invention has been described in terms of particular embodiments in this application, one of ordinary skill in the art, in light of the teachings herein, can generate additional embodiments and modifications without departing from the spirit of or exceeding the scope of the described invention. For example, although the external runflat apparatus 10 has been described as having the one or more tread members 14 removeably connected to the hub member 12 with fasteners 24, will appreciated that other connectors, or connection methods, may be utilized to connect the one or more tread member 14 to the hub member 12. For example, the one or more head members 14 may be bonded to the hub member 12, welded to the hub member 12, or mechanically connected to the hub member 12 with a snap or other type of fastener. Accordingly, it is understood that the drawings and the descriptions herein are preferred only to facilitate comprehension of the invention and should not be construed to limit the scope thereof.

What is claimed is:

1. An external runflat apparatus for a guide wheel system of a monorail transport system, the external runflat apparatus comprising:
    a hub member configured to receive a stud for connection to a guide wheel of the monorail transport system; and
    a tread member connected to the hub member, wherein the tread member comprises:
        a plurality of base members removably connected to the hub member, wherein at least one of the base members defines a plurality of ear members; and
        a plurality of coverings, wherein each covering is over a corresponding base member.

2. The external runflat apparatus of claim 1, wherein the hub member is substantially circular and defines a central opening therethrough.

3. The external runflat apparatus of claim 2, wherein the hub member further defines:
    a first plurality of openings positioned radially outward from the central opening;
    a second plurality of openings positioned radially outward from the first plurality of openings; and
    at least one opening positioned between the first and second pluralities of openings.

4. The external runflat apparatus of claim 1, wherein the tread member is removeably connected to the hub member.

5. The external runflat apparatus of claim 1, wherein the tread member is bonded to the hub member.

6. The external runflat apparatus of claim 1, wherein the tread member is welded to the hub member.

7. The external runflat apparatus of claim 1, wherein the tread member is substantially circular-shaped.

8. The external runflat apparatus of claim 1, wherein the external runflat apparatus comprises a plurality of tread members connected to the hub member, and wherein at least one of the plurality of tread members is substantially arc-shaped.

9. The external runflat apparatus of claim 1, wherein at least one of the base members defines a plurality of perforations therethrough.

10. The external runflat apparatus of claim 1, wherein at least one of the plurality of ear members defines an opening therethrough.

11. The external runflat apparatus of claim 10, further comprising a bushing connected to the tread member and coaxially aligned with the opening defined by the at least one of the plurality of ear members.

12. The external runflat apparatus of claim 1, wherein at least one of the coverings comprises a thermoplastic material.

13. The external runflat apparatus of claim 1, wherein at least one of the coverings comprises a thermoset material.

14. The external runflat apparatus of claim 1, wherein at least one of the coverings comprises a rubber material.

15. The external runflat apparatus of claim 1, wherein at least one of the coverings comprises a composite material.

16. The external runflat apparatus of claim 1, wherein at least one of the coverings includes an ultra violet additive.

17. The external runflat apparatus of claim 1, wherein at least one of the coverings includes a moisture resistant additive.

18. The external runflat apparatus of claim 1, wherein at least one of the coverings is adhered to its corresponding base member.

19. The external runflat apparatus of claim 1, wherein at least one of the coverings is mechanically fixed to its corresponding base member.

20. The external runflat apparatus of claim 1, wherein at least one of the coverings is welded to its corresponding base member.

21. The external runflat apparatus of claim 1, wherein at least one of the coverings is vulcanized to its corresponding base member.

22. A wheel system of a monorail transport system, the wheel system comprising:
    a guide wheel having a rim and an inflatable tire mounted on the rim; and
    a runflat apparatus connected to the guide wheel and external to the tire, wherein the runflat apparatus comprises:
        a hub member, wherein the hub member defines a plurality of openings, wherein at least one of the plurality of openings is configured to receive a stud which connects the hub member to the guide wheel of the monorail transport system; and
        a tread member connected to the hub member, wherein the tread member comprises:
            a plurality of base members removably connected to the hub member; and
            a plurality of coverings, wherein each covering is over a corresponding base member.

* * * * *